United States Patent [19]

Slavens

[11] 4,285,458
[45] Aug. 25, 1981

[54] WELDING BACKUP SHOE APPARATUS

[75] Inventor: Clyde M. Slavens, Houston, Tex.

[73] Assignee: Midcon Pipeline Equipment Co., Houston, Tex.

[21] Appl. No.: 79,533

[22] Filed: Sep. 27, 1979

[51] Int. Cl.³ .............................................. B23K 37/06
[52] U.S. Cl. .................................... 228/49 B; 228/50; 219/160
[58] Field of Search .......................... 228/46, 49 B, 50; 219/160, 161; 269/254 R, 254 CS

[56] References Cited

U.S. PATENT DOCUMENTS

| | | | |
|---|---|---|---|
| 2,365,226 | 12/1944 | Stout | 228/50 |
| 3,940,048 | 2/1976 | Casey | 228/50 |
| 4,165,831 | 8/1979 | Connell | 228/50 |

FOREIGN PATENT DOCUMENTS 79655  2/1971  German Democratic Rep. ... 228/49 B

Primary Examiner—Joseph H. McGlynn
Assistant Examiner—K. J. Ramsey
Attorney, Agent, or Firm—Carl B. Fox, Jr.

[57] ABSTRACT

Welding backup shoe apparatus, wherein plural backup shoes are carried side-by-side on flexible bands, each backup shoe being resiliently biased outwardly so that the backup shoes are resiliently pressed against the inner side of a weld joint between end-to-end pipe sections to prevent blowthrough of weld metal through the joint during welding and to dissipate heat from the weld metal. A pair of bands, each carrying a plurality of backup shoes, are supported by the shoes of a welding clamp, the bands being disposed at the upper and lower interior of the pipes to be expanded outwardly when the welding clamp shoes are expanded and to be retracted inwardly when the welding clamp shoes are retracted.

29 Claims, 7 Drawing Figures

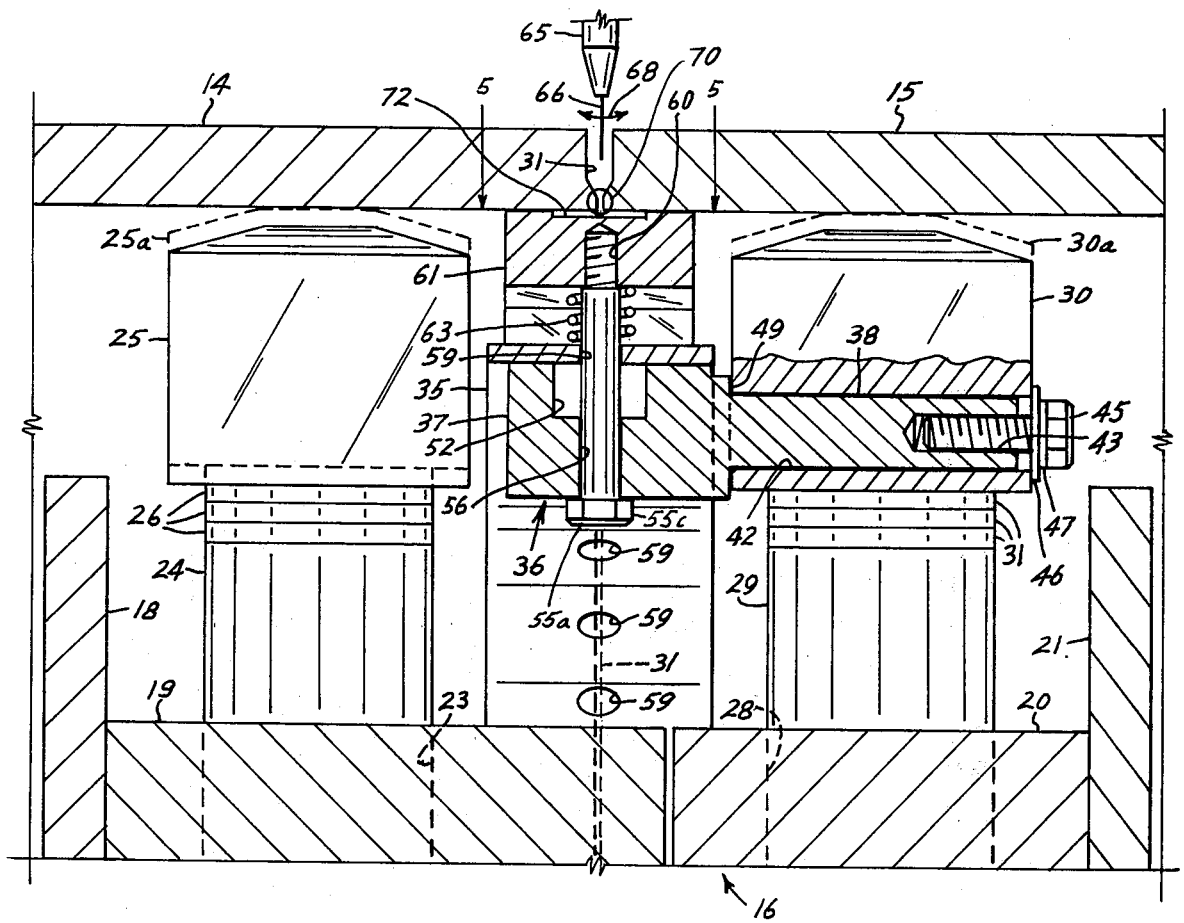
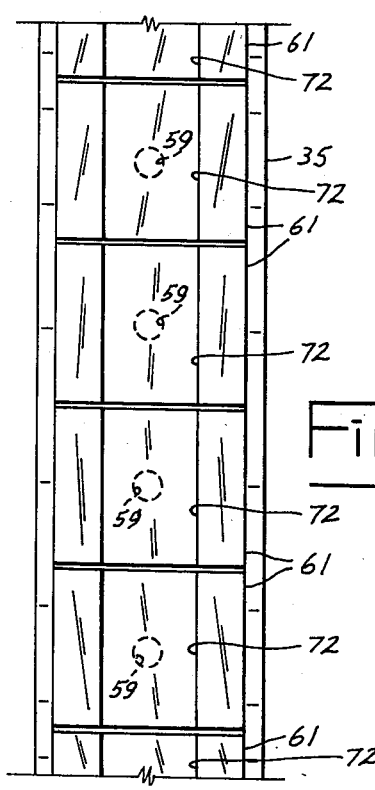
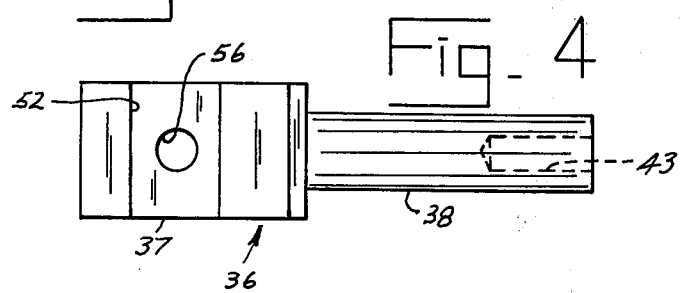
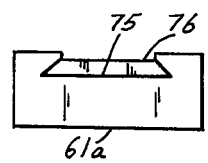
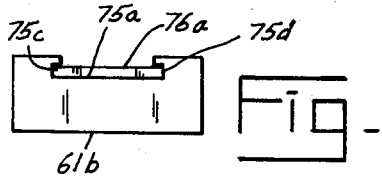

WELDING BACKUP SHOE APPARATUS

BACKGROUND OF THE INVENTION

Welding backup shoes are employed at one side of a weld joint to prevent blowthrough of weld metal as welding is performed from the other side of the weld joint. In the welding together of pipe joints or lengths end-to-end, especially when pipes of relatively large sizes are welded together end-to-end, it is desirable when the welding is done from the pipe exteriors to provide a backup at the pipe interiors to prevent blowthrough of weld metal and to improve the uniformity and smoothness of the interior side of the weld so that grinding or other finishing operations of the weld at the interiors of the pipes will not be necessary. The interior side of the weld must be such that flow through the pipes will not interfere with and the weld must be formed with adequate weld penetration. Welding backups have, in the art, been provided by numerous forms of backup strips or shoes, none of which has been entirely satisfactory.

Weld metal blowthrough occurs most readily at the upper and lower sides of the pipes, and does not occur at the arcuately vertical pipe sides. One difficulty in providing backup apparatuses at the pipe interiors is that the backup apparatus is disposed between the shoes of a welding clamp device and must be capable of being expanded around the joint after the pipe ends have been brought together, and must be pressed against the interior pipe surfaces bridging the joint so that no lapses in backup will occur at least at the upper and lower sides of the pipes where blowthrough is most likely to occur. The invention seeks to provide improved backup apparatuses for use in welding pipes together end-to-end from the exteriors of the pipes so that satisfactory welds can consistently be obtained.

SUMMARY OF THE INVENTION

The invention provides backup shoe apparatus for backing up girth welds formed from the exteriors of pipes disposed end-to-end. When pipes are welded together end-to-end, the pipe ends are held in position by an internal clamping apparatus which has a circularly spaced plurality of expandable clamp elements or shoes within the end of each of the pipes. The clamp causes the pipe ends to be brought to circular form as well as holding the pipe ends properly abutted for welding. According to the invention, a pair of bands are supported by supporting elements fixed to one circularly spaced plurality of clamp shoes, one band being at each of opposite sides of the pipe interior, and each band carrying a plurality of backup elements disposed side by side around the length of the band, and each backup element being spring biased outwardly. The bands are expanded outwardly by setting of the clamp, and the spring elements which bias the backup elements outwardly insure that each of the backup elements will be flushly engaged with the inner side of the pipe wall. Since the backup elements cannot properly be set until the pipe ends have been brought together to welding position, the bands which carry the backup elements are supported by the plurality of clamp shoes which is set within the second pipe section. The plurality of clamp shoes which is set within the first pipe section is set in place first, and then the second pipe is brought to position of abutment with the first pipe, and then when the second plurality of clamp shoes is expanded the bands carrying the backup elements are automatically disposed across the joint between the two pipe sections. Each of the bands is fixed to one of the band supporting elements carried by the clamp shoes only at one point near the center of the length of the band. The ends of each band are held inwardly curved against the other band supporting elements by a spring which extends from the opposite ends of the band around the opposite side of the clamp assembly.

The apparatus provided according to the invention will be most effective when welding of the pipe ends together is performed by a welding torch which is oscillated transverse to the joint. This is because the plural backup elements which are affixed to each band have small cracks therebetween, and welding without welding tip oscillation would cause weld metal to enter between these gaps. With welding tip oscillation as described in applications for U.S. Letters Patent Ser. No. 062,685, filed Aug. 1, 1979, and Ser. No. 062,686, filed Aug. 1, 1979, such blowthrough will not occur because the weld metal is deposited along parallel paths at opposite sides of the weld joint.

A principal object of the invention is to provide welding backup shoe apparatus of novel form. Another object of the invention is to provide such apparatus in which a plurality of backup elements are carried by a pair of bands, one at each side of the interiors of pipes to be welded together. A further object of the invention is to provide such apparatus wherein the backup elements are spring biased outwardly to be firmly uniformly held against the pipe walls. Still another object of the invention is to provide such apparatus which operates automatically when the welding clamps are set within the pipes prior to welding. A further object of the invention is to provide such apparatus which is simple, inexpensive, and yet is entirely dependable and reliable in operation.

Other objects and advantages of the invention will appear from the following detailed description of preferred embodiments thereof, reference being made to the accompanying drawings.

BRIEF DESCRIPTION OF THE DRAWINGS

FIG. 3 is a partial transverse cross section taken at line 3—3 of FIG. 1.

FIG. 4 is an upper elevation of a band support element according to the invention.

FIG. 5 is a partial elevation taken at line 5—5 of FIG. 3.

FIGS. 6 and 7 are end elevations of modified forms of backup elements according to the invention.

DESCRIPTIONS OF THE PREFERRED EMBODIMENTS

Figure 1:
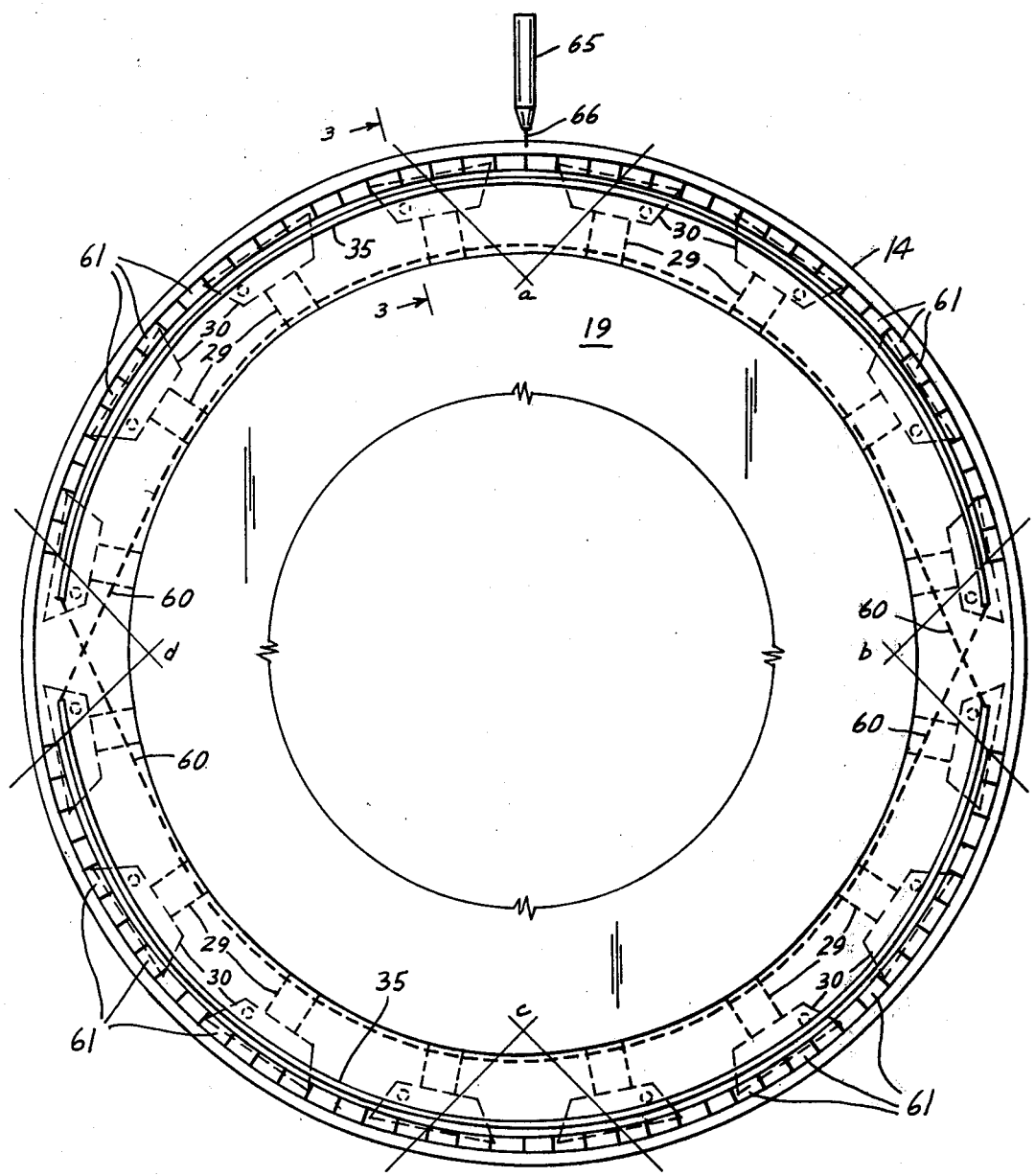
FIG. 1 is an end elevation of a preferred form of apparatus according to the invention, the drawing being schematic in part.
Figure 2:
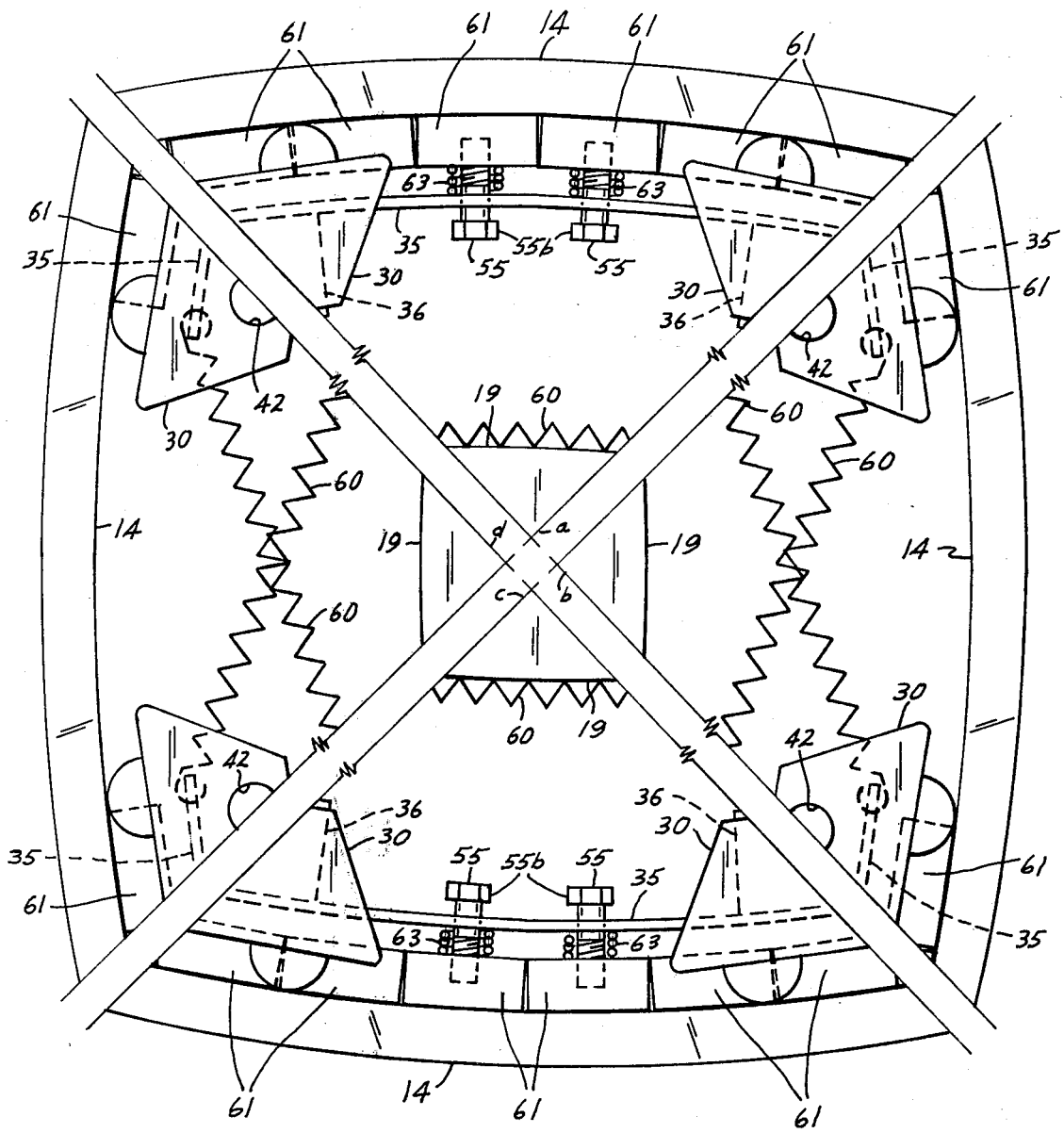
FIG. 2 is a partial enlarged drawing, in end elevation, made up of the pie shaped portions a, b, c, d, indicated in FIG. 1, and moved inwardly.

Referring now to the drawings in detail, and first to FIGS. 1-3 of the drawings, two lengths or sections of pipe 14, 15 are shown in FIG. 3 disposed end-to-end for welding. A welding clamp device 16 includes elements 18–21, which will not be completely described since they do not of themselves form a part of the invention and may be provided in a variety of forms. Element 19 is ringshaped and has a plurality of circularly spaced radial passages 23 in each of which is slideably disposed a shaft 24 to the outer end of which is affixed a clamp shoe 25. Spacer rings 26 are provided at the outer end of shaft 24 beneath shoe 25 in order that the outward position of shoe 25 may be adjusted by either taking away some or all of the rings 26 or adding additional of the rings 26. Each shoe 25 is bolted to a shaft 24 by a bolt axial of the shaft, not shown. Element 20 of clamp assembly 16 similarly has plural circularly spaced radial passages 28 in each of which is slideably disposed a shaft 29. A clamp shoe 30 is fixed to the outer end of each shaft 29, the outward position of the shoe being adjustable by taking away or adding spacer rings 31.

Only one each of the shafts 24, 29 and shoes 25, 30 is shown in FIG. 3, it being understood that pluralities of such are provided around the pipe peripheries at opposite sides of the welding gap 31 formed between the pipe ends.

The clamp assembly 16 is first set in the end of pipe 14 by expanding shafts 24 and shoes 25 to engage the interior side of the wall of pipe 14. Before expansion of the clamp shoes, the apparatus is positioned such that the gap is midway between shoes 25 and 30. Shoes 25 are shown in partially retracted positions by the solid line showing and in the expanded condition by the dashed line showing 25a. When fully retracted, shoes 25 and 35 are farther inward than shown. Pipe 15 is not in position when shoes 25 are expanded and set in pipe 14. After shoes 25 have been expanded and set in the end of pipe 14, pipe 15 is brought into place with clamp shoes 30 in retracted condition. The proper welding gap 31 spacing between the pipe ends is achieved, and then shoes 30 are expanded to their dashed lines positions 30a.

At the upper and lower interiors of the pipes, bands 35 slightly shorter than semi-circular in length are supported by a plurality of band support elements 36 carried by the clamp shoes 30. Each element 36 includes a rectilinear block-shaped portion 37 having a cylindrical rod portion 38 extending from one of its sides. Each shoe 30 has a cylindrical passage 42 therethrough adapted to receive the shaft 38 of one of the band support elements 36. A tapped opening 43 in the end of each rod portion 38 receives a screw 45 which is tightened against washers 46, 47 to draw shoulder 49 of block portion 37 of the element 26 against the side of the respective shoe 30.

The outer surface of each element 36 is relieved by a slot 52. The band 35 is disposed over the outer surface of each element 36 over which it passes but is affixed to an element 36 only at positions 36a, 36b near the centers of the lengths of the bands 35. The bands 35 are not affixed to the other elements 36 at all, but are simply disposed against the outer surface of each element 36. The slots 52 are provided so that the heads of screws 55 (FIG. 2) may be received therein. In the case of positions 36a, 36b, longer screws 55a are used which extend completely through the elements 36 through cylindrical openings 56 thereof. Each screw 55, 55a is disposed through a circular hole 59 through one of the bands 35, and screwed into the tapped opening 60 of one of the backup shoe elements 61. Backup elements 61 are preferably formed of copper or aluminum. A helical compression spring 63 is disposed around each screw 55, 55a between the band 35 and each backup shoe element 61. Because of the small sizes of these screws 55, 55a and the springs 61 according to the scale of FIG. 1, these elements are not shown in FIG. 1.

As has previously been mentioned, clamp shoes 25, 30 are shown partially retracted in their solid lines drawings in FIG. 3. Shoes 25 are, of course, expanded to their dashed lines positions 25a prior to the setting of shoes 30. When shoes 30 are expanded to their pipe engaging positions 30a, the elements 36 are moved outwardly the same distances that the shoes 30 are moved outwardly. When the elements 36 are moved outwardly, the backup elements 61 are moved to against the pipe walls, bridging the gap 31, and screws 55 are held against further outward movement whereby their heads 55b become spaced from the bands 35. The heads 55c of screws 55a are similarly moved away from the inner sides of the elements 36. The outward biasing forces of the springs 63 bias the backup elements 61 firmly against the walls of the pipes.

A helical tension spring 60 is connected between the opposite ends of each band 35. Each spring 60 extends under tension around the opposite side of ring element 19 of the clamp assembly, the springs 60 thereby holding the bands 35 inwardly against the elements 36 carried by each of the clamp shoes 30. The springs 30 are, of course, stretched when shoes 30 are expanded to move the elements 36 outwardly.

The welding backup shoe assembly provided according to the invention is most useful in connection with welding torch apparatus wherein the welding tip is oscillated side to side across the welding gap 31. The welding torch 65 and/or the welding electrode tip 66 are oscillated so that the tip travels back and forth within the gap as indicated by arrow 68. Such apparatus is available wherein weld metal deposition is in parallel paths on opposite sides of the welding gap so that few, if any, of the weld metal droplets strike the narrow inner portion of the gap. As the weld 70 is formed around the inner portions of gap 31, the molten metal resulting from the weld formation moves inwardly against backup shoe elements 61. Contact with the shoe elements chills the weld metal and stops further inward flow thereof. Usually, the backup shoes 61 will be relieved at their areas bridging the weld gap by shallow slots 72. The slots 72 may or may not be provided. Provision of the slots 72 insures that full penetration by the weld at the gap will occur.

Modified forms of the backup shoes 61a and 61b are shown in FIGS. 6 and 7, respectively. Shoes 61a have rabbet slots 75 at their outer surfaces which receive correspondingly formed inserts 76. The inserts 76 may be formed of a ceramic material, a thorated tungsten material, or a carbon material which is capable of withstanding and dissipating the heat developed by the welding operation, and to which the weld metal does not tend to stick unduly. Any insert material having the required qualifications may be used.

Backup shoes 61b are similar to shoes 61a. In the case of shoes 61b, the slot or groove 75a is undercut at its opposite sides 75c, 75d and the insert 76a is in the form of a flat band or strip which extends into the opposite undercut portions of the slot. The inserts 75a may be of the same materials as described for inserts 76. The modified backup shoes 61a, 61b are provided especially for use in the case where copper contact with the weld metal is not desired. The shoes 61 will in most cases be made of copper or aluminum or other highly heat conductive material such that heat dissipation from the weld metal is rapidly accomplished. Sometimes there is objection to a metal such as copper or aluminum coming into contact with the weld metal since it is believed by some that the copper or aluminum may become combined to some degree with the weld metal, thereby diminishing the quality of the weld. In this situation, the inserts 76 or 76a may be employed in order that no metal capable of diminishing weld quality comes into contact with the weld metal.

The apparatus provided according to the invention is simple and relatively inexpensive. It may be combined with substantially any form of welding clamp apparatus. All that is required is that the clamp shoes 30 of the set of clamp shoes which engages a desired one of the pipes 14, 15 be drilled to provide the cylindrical passageways 42 therethrough. It will have been noted that the elements 36 may be connected to any portion of a shoe 30. In some cases it will be desired that the elements 36 be at one end portion of the shoes 30, and in other cases it may be desired that the elements 36 be at the opposite ends of the shoes 30. If found desirable, two elements 36 could be affixed to each shoe 30 or to some of the shoes 30. Elements 36 are reversible in position to move the openings 42 to either side of the shaft 29.

The lengths of the bands 35 are such that the bands will clear one another at opposite sides of the apparatus where the ends of the bands are adjacent when shoes 30 are fully retracted. When the bands are expanded by expansion of the clamp shoes 30, the ends of bands 35 will be separated somewhat more. But this separation of the band ends and the resulting discontinuity of the backup elements 61 occurs at the sides of the pipe where blowthrough of weld metal is not likely to occur. Most weld metal blowthrough and other welding difficulties occur at the top and bottom of the pipe, and virtually no difficulty exists where the weld is substantially vertical as at the opposite sides of the pipes.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

I claim:

1. Apparatus for backing up welds during formation of the welds comprising a pair of flexible semicircular band means disposed end-to-end in spaced circular configuration, means biasing the adjacent band ends toward one another to retract the band means, plural backup elements disposed adjacently side by side along the convex outer side of each said band means, means connecting each said backup element to said band means and resiliently biasing said backup elements radially outwardly from said band means, and support means for supporting said band means whereby said backup elements may be resiliently disposed against a weld joint between the ends of aligned sections of pipe.

2. The combination of claim 1, said connecting said means backup elements to said band means including spring means disposed between each said backup element and said band means.

3. The combination of claim 2, said spring means each comprising a helical compression spring.

4. The combination of claim 1, said support means comprising a plurality of pipe clamp shoes of a circularly spaced set of pipe clamp shoes.

5. The combination of claim 1, said support means comprising a plurality of support elements each connected to a clamp shoe of a circularly spaced set of pipe clamp shoes and movable radially inwardly and outwardly therewith whereby said backup elements are moved outwardly to be set against the weld joint when said pipe clamp shoes are set in the end of a pipe.

6. The combination of claim 5, each said support element comprising a support body having a laterally extending portion connectable into an axial hole provided through a clamp shoe whereby said support body may be fixed at one side of said clamp shoe, said arcuate bands being disposed against the radially outward sides of said support bodies.

7. The combination of claim 1, 4, 5 or 6, wherein said arcuate bands disposed end-to-end comprise a substantially complete circle.

8. The combination of claim 1, 4, 5 or 6, wherein said arcuate bands are flexible end-to-end whereby they engage all of said support elements.

9. The combination of claim 1, each said backup element being composed of a highly heat conductive material.

10. The combination of claim 9, said highly heat conductive material being copper.

11. The combination of claim 9, said highly heat conductive material being aluminum.

12. The combination of claim 9, each said backup element having an insert element at its side facing the weld joint whereby weld metal does not contact the material of which said backup element is made.

13. The combination of claim 12, each said insert element being formed of a ceramic material.

14. The combination of claim 12, each said insert element being formed of a thorated tungsten material.

15. The combination of claim 1, 2, 3, 4, 5 or 6, said backup elements being flexibly supported whereby they will flushly engage both sides of a weld joint even though the weld joint is stepped.

16. The combination of claim 1, 2, 3, 4, 5 or 6, wherein each said backup element has a shallow central relief at its radially outward surface in the direction of the weld joint whereby the backup elements are spaced from the weld joint at their central portions.

17. Apparatus for backing up welds during formation of the welds comprising a pair of arcuate bands disposable end-to-end in a circular configuraiton, plural backup elements disposed adjacently side by side along one side of each said bands, means connecting each said backup element to a said band and resiliently biasing said backup elements outwardly from said band, and support means for supporting said bands whereby said backup elements may be resiliently disposed against a weld joint, said means connecting said backup elements to said bands including helical compression spring means disposed between each said backup element and a said band, said support means comprising a plurality of support elements each connected to a clamp shoe of a circularly spaced set of pipe clamp shoes and movable radially inwardly and outwardly therewith whereby said backup elements are moved outwardly to be set against the weld joint when said pipe clamp shoes are set in the end of a pipe, each said support element comprising a support body having a laterally extending portion connectable into an axial hole provided through a clamp shoe whereby said support body may be fixed at one side of said clamp shoe, said arcuate bands being disposed against the radially outward sides of said support bodies, and including a tension spring means connected between the opposite ends of each said arcuate band, each said tension spring means being disposable under tension around the opposite side of the pipe clamp body from the respective arcuate band to hold the arcuate band against the support elements against which the arcuate band is disposed.

18. The combination of claim 17, each said arcuate band being fixed to one of said support elements at a central point of the arcuate band.

19. The combination of claim 17 or 18, wherein said arcuate bands disposed end-to-end comprise a substantially complete circle.

20. The combination of claim 17 or 18, wherein said arcuate bands are flexible end-to-end whereby they engage all of said support elements.

21. The combination of claim 17 or 18, said backup elements being flexibly supported whereby they will flushly engage both sides of a weld joint even though the weld joint is stepped.

22. The combination of claim 17 or 18, wherein each said backup element has a shallow central relief at its radially outward surface in the direction of the weld joint whereby the backup elements are spaced from the weld joint at their central portions.

23. Welding backup apparatus, comprising a pair of arcuate bands disposed end-to-end in circular disposition, a plurality of backup shoes disposed side-by-side along the length of each said arcuate band, each said arcuate band having an opening therethrough centrally of each said backup element, an outwardly extending fastener disposed slidably through each said opening and being connected to the respective backup shoe at its outer end and having an enlarged portion at the inner side of said band to limit outward movement thereof, a helical compression spring disposed around each said fastener between the arcuate band and the respective backup shoe whereby each said backup shoe is resiliently biased outwardly, support means each connected to a pipe clamp shoe of a plurality of circularly spaced clamp shoes of a pipe clamp apparatus and movable radially inwardly and outwardly therewith, said arcuate bands being disposed around the outer faces of said support means, a tension spring connected between the opposite ends of each said arcuate band and extending around the opposite side of said pipe clamp apparatus whereby said arcuate bands are biased inwardly against said support means, and a connection between a longitudinally central part of each said band and one of said support means, said backup shoes being moved outwardly to each engage across a welding gap between pipes disposed end-to-end for welding when said clamp shoes are moved outwardly to set said pipe clamp apparatus within the end of one of said pipes.

24. The combination of claim 23, said pipe clamp apparatus having an additional plurality of circularly spaced clamp shoes opposite said arcuate bands from said first-named plurality of circularly spaced clamp shoes for setting in the end of the other of said pipes.

25. The combination of claim 23, each said tension spring comprising a helical spring.

26. The combination of claim 23, each said backup shoe being recessed at the central portion of its outer surface to space said central portion from the welding gap.

27. The combination of claim 23, each said backup shoe having a slot along the central portion of its outer surface in the direction of the welding gap, an insert element fixed in each of said slots, whereby said insert elements are disposed along the welding gap whereby the weld metal contacts the material of said insert elements and does not contact the material of said backup shoes.

28. The combination of claim 27, said insert elements being formed of ceramic material.

29. The combination of claim 23, said insert elements being formed of a thorated tungsten material.

* * * * *

UNITED STATES PATENT OFFICE
CERTIFICATE OF CORRECTION

PATENT NO. : 4,285,458
DATED : AUGUST 25, 1981
INVENTOR(S) : CLYDE M. SLAVENS

It is certified that error appears in the above-identified patent and that said Letters Patent are hereby corrected as shown below:

Column 1, line 18, change "not interfere" to read -- not be interfered --.

Column 5, line 56, before "connecting" insert -- means --.

Column 5, line 57, delete "means" (first occurence).

Signed and Sealed this

Twenty-ninth Day of December 1981

[SEAL]

Attest:

GERALD J. MOSSINGHOFF

Attesting Officer    Commissioner of Patents and Trademarks